(12) United States Patent
Ryon

(10) Patent No.: US 11,891,956 B2
(45) Date of Patent: Feb. 6, 2024

(54) CONTINUOUS IGNITION DEVICE EXHAUST MANIFOLD

(71) Applicant: Delavan Inc., Des Moines, IA (US)

(72) Inventor: Jason Ryon, Carlisle, IA (US)

(73) Assignee: DELAVAN INC., Des Moines, IA (US)

(*) Notice: Subject to any disclaimer, the term of this patent is extended or adjusted under 35 U.S.C. 154(b) by 0 days.

(21) Appl. No.: 17/835,525

(22) Filed: Jun. 8, 2022

(65) Prior Publication Data

US 2022/0316402 A1  Oct. 6, 2022

Related U.S. Application Data

(63) Continuation of application No. 17/123,741, filed on Dec. 16, 2020, now Pat. No. 11,421,602.

(51) Int. Cl.
*F02C 7/00* (2006.01)
*F02C 7/264* (2006.01)

(52) U.S. Cl.
CPC .......... *F02C 7/264* (2013.01); *F05D 2220/32* (2013.01); *F05D 2240/35* (2013.01); *F05D 2260/85* (2013.01)

(58) Field of Classification Search
None
See application file for complete search history.

(56) References Cited

U.S. PATENT DOCUMENTS

| 2,540,642 | A |   | 2/1951  | Sidney et al. |         |
|-----------|---|---|---------|---------------|---------|
| 2,541,900 | A |   | 2/1951  | Williams      |         |
| 2,645,082 | A |   | 7/1953  | Sarto         |         |
| 2,648,951 | A |   | 8/1953  | McDougal      |         |
| 2,734,341 | A | * | 2/1956  | Lovesey       | F23R 3/20 |
|           |   |   |         |               | 60/762  |
| 2,784,553 | A | * | 3/1957  | Serafino      | F02C 7/264 |
|           |   |   |         |               | 60/39.826 |
| 2,811,676 | A |   | 10/1957 | Beye          |         |
| 2,840,742 | A |   | 6/1958  | Watters       |         |
| 2,847,826 | A |   | 8/1958  | Dennis        |         |
| 2,864,234 | A |   | 12/1958 | Seglem et al. |         |
| 2,885,859 | A |   | 5/1959  | Fortunato     |         |
| 2,958,196 | A | * | 11/1960 | Gatzemeyer    | F23R 3/48 |
|           |   |   |         |               | 60/39.826 |
| 2,967,224 | A |   | 1/1961  | Irwin         |         |
| 3,009,321 | A |   | 11/1961 | Jones et al.  |         |

(Continued)

FOREIGN PATENT DOCUMENTS

DE       1064760 B      9/1959
DE    102018214281 B3   8/2019

(Continued)

OTHER PUBLICATIONS

Extended European Search Report for EP Application No. 21214883.7, dated May 13, 2022, pp. 10.

(Continued)

*Primary Examiner* — Edwin Kang
(74) *Attorney, Agent, or Firm* — Kinney & Lange, P. A.

(57) ABSTRACT

A torch ignitor system provides a continuous flame to ignite fuel within a combustor of a gas turbine engine. The torch ignitor system includes a manifold and a plurality of torch nozzles to enable the flame or torch to simultaneously ignite multiple fuel nozzles within the combustor of the gas turbine engine.

10 Claims, 12 Drawing Sheets

(56) References Cited

U.S. PATENT DOCUMENTS

| | | | |
|---|---|---|---|
| 3,487,636 A | 1/1970 | Vdoviak et al. | |
| 3,558,251 A | 1/1971 | Bauger et al. | |
| 3,690,093 A | 9/1972 | Carlisle | |
| 3,898,797 A | 8/1975 | Wood | |
| 3,954,389 A * | 5/1976 | Szetela | F23M 5/085 60/753 |
| 3,990,834 A | 11/1976 | Dubell et al. | |
| 4,012,904 A | 3/1977 | Nogle | |
| 4,099,373 A | 7/1978 | Griffin et al. | |
| 4,112,675 A | 9/1978 | Pillsbury et al. | |
| 4,141,213 A | 2/1979 | Ross | |
| 4,192,139 A | 3/1980 | Buchheim | |
| 4,194,358 A | 3/1980 | Stenger | |
| 4,351,156 A | 9/1982 | White et al. | |
| 4,412,414 A | 11/1983 | Novick et al. | |
| 4,441,323 A | 4/1984 | Colley | |
| 4,828,488 A | 5/1989 | Reiser et al. | |
| 4,860,533 A | 8/1989 | Joshi | |
| 4,912,931 A | 4/1990 | Joshi et al. | |
| 4,915,615 A | 4/1990 | Kawamura et al. | |
| 5,085,040 A | 2/1992 | Tilston | |
| 5,390,855 A | 2/1995 | Mims et al. | |
| 5,469,700 A | 11/1995 | Corbett et al. | |
| 5,499,497 A | 3/1996 | Defreitas | |
| 5,636,511 A | 6/1997 | Pfefferle et al. | |
| 5,640,841 A | 6/1997 | Crosby | |
| 5,673,554 A | 10/1997 | Defreitas et al. | |
| 5,695,328 A | 12/1997 | Defreitas et al. | |
| 5,720,163 A | 2/1998 | Pfefferle et al. | |
| 5,744,206 A | 4/1998 | Russek et al. | |
| 5,845,480 A | 12/1998 | Defreitas et al. | |
| 6,138,654 A | 10/2000 | Pretorius et al. | |
| 6,182,436 B1 * | 2/2001 | Prociw | F23R 3/32 60/776 |
| 6,195,247 B1 | 2/2001 | Cote et al. | |
| 6,240,731 B1 | 6/2001 | Hoke et al. | |
| 6,247,300 B1 | 6/2001 | Muramatsu et al. | |
| 6,483,022 B1 | 11/2002 | Packard | |
| 6,884,967 B1 | 4/2005 | Leigh | |
| 6,915,638 B2 | 7/2005 | Runkle et al. | |
| 6,952,927 B2 | 10/2005 | Howell et al. | |
| 6,968,699 B2 | 11/2005 | Howell et al. | |
| 7,124,724 B2 | 10/2006 | Fleetwood | |
| 7,137,255 B2 | 11/2006 | Schmotolocha et al. | |
| 7,216,488 B2 | 5/2007 | Howell et al. | |
| 7,470,875 B1 | 12/2008 | Wilcox et al. | |
| 7,481,248 B2 | 1/2009 | Prociw et al. | |
| 7,637,094 B2 | 12/2009 | Costello et al. | |
| 8,365,710 B2 | 2/2013 | Lykowski et al. | |
| 8,713,944 B2 | 5/2014 | Bleeker | |
| 9,080,772 B2 | 7/2015 | Prociw et al. | |
| 9,135,755 B2 | 9/2015 | Youssef | |
| 9,279,398 B2 | 3/2016 | McAlister | |
| 9,413,141 B2 | 8/2016 | Leglaye et al. | |
| 9,453,491 B2 | 9/2016 | Tanaka et al. | |
| 9,476,399 B1 | 10/2016 | Munson | |
| 9,567,912 B2 | 2/2017 | Prociw et al. | |
| 10,041,859 B2 | 8/2018 | Desilva et al. | |
| 10,156,189 B2 | 12/2018 | Sze et al. | |
| 10,488,047 B2 | 11/2019 | Ott et al. | |
| 10,584,639 B2 | 3/2020 | Dam et al. | |
| 10,711,699 B2 | 7/2020 | Dam et al. | |
| 10,823,398 B2 | 11/2020 | Choudhri et al. | |
| 11,209,164 B1 | 12/2021 | Ryon et al. | |
| 11,226,103 B1 | 1/2022 | Ryon et al. | |
| 11,255,535 B1 | 2/2022 | Eckert et al. | |
| 11,473,505 B2 | 10/2022 | Ryon et al. | |
| 2002/0050061 A1 | 5/2002 | Komyoji et al. | |
| 2002/0162333 A1 | 11/2002 | Zelina | |
| 2004/0050061 A1 | 3/2004 | Schmotolocha et al. | |
| 2004/0168442 A1 | 9/2004 | Schmotolocha et al. | |
| 2005/0053876 A1 | 3/2005 | Joos et al. | |
| 2005/0166595 A1 | 8/2005 | Fletcher et al. | |
| 2005/0284442 A1 | 12/2005 | Stuttaford et al. | |
| 2006/0054233 A1 | 3/2006 | Prociw et al. | |
| 2006/0168967 A1 | 8/2006 | Simons et al. | |
| 2008/0036209 A1 | 2/2008 | Bulkovitch | |
| 2008/0141651 A1 | 6/2008 | Eason et al. | |
| 2008/0299504 A1 | 12/2008 | Horn | |
| 2009/0234555 A1 | 9/2009 | Williams et al. | |
| 2009/0314000 A1 * | 12/2009 | Evulet | F23R 3/343 60/737 |
| 2010/0043444 A1 | 2/2010 | Gross et al. | |
| 2010/0071343 A1 | 3/2010 | Yu | |
| 2010/0126617 A1 | 5/2010 | Stroempl et al. | |
| 2011/0088409 A1 | 4/2011 | Carlisle | |
| 2011/0113787 A1 | 5/2011 | Milosavljevic | |
| 2011/0247341 A1 | 10/2011 | McMahan et al. | |
| 2011/0247590 A1 | 10/2011 | Donovan | |
| 2011/0271684 A1 * | 11/2011 | Corsmeier | F23R 3/42 60/753 |
| 2012/0085468 A1 | 4/2012 | Walker | |
| 2012/0125008 A1 | 5/2012 | Prociw et al. | |
| 2012/0234013 A1 * | 9/2012 | Overman | F23R 3/283 60/746 |
| 2012/0266604 A1 * | 10/2012 | Popovic | F23R 3/14 60/737 |
| 2013/0000323 A1 | 1/2013 | Kupratis | |
| 2013/0040255 A1 | 2/2013 | Shi et al. | |
| 2013/0143171 A1 | 6/2013 | Soda et al. | |
| 2013/0174562 A1 * | 7/2013 | Holcomb | F23R 3/002 60/752 |
| 2013/0283800 A1 * | 10/2013 | Romig | F23R 3/286 60/746 |
| 2014/0060063 A1 | 3/2014 | Boardman et al. | |
| 2014/0150401 A1 | 6/2014 | Venter | |
| 2014/0215997 A1 | 8/2014 | Lior et al. | |
| 2014/0216384 A1 | 8/2014 | Tanaka et al. | |
| 2014/0260304 A1 * | 9/2014 | Cummings, III | C10L 1/328 60/734 |
| 2014/0290259 A1 | 10/2014 | Plante et al. | |
| 2014/0314548 A1 * | 10/2014 | Rivers | F01D 17/105 29/889 |
| 2014/0366505 A1 * | 12/2014 | Prociw | F02C 7/266 60/39.821 |
| 2014/0366542 A1 | 12/2014 | Teets | |
| 2014/0366551 A1 | 12/2014 | Prociw et al. | |
| 2015/0036781 A1 | 2/2015 | Youssef | |
| 2015/0040575 A1 | 2/2015 | Martinez Fabre et al. | |
| 2015/0260406 A1 | 9/2015 | Carrere | |
| 2015/0275755 A1 | 10/2015 | Ogata et al. | |
| 2015/0275769 A1 | 10/2015 | Foutch et al. | |
| 2015/0308351 A1 | 10/2015 | Sheridan | |
| 2015/0345426 A1 | 12/2015 | Houston et al. | |
| 2015/0345788 A1 | 12/2015 | Miyata et al. | |
| 2015/0354517 A1 | 12/2015 | Mansour et al. | |
| 2016/0003150 A1 | 1/2016 | Dicintio et al. | |
| 2016/0010559 A1 | 1/2016 | Hoke et al. | |
| 2016/0047318 A1 | 2/2016 | Dam et al. | |
| 2016/0084169 A1 | 3/2016 | Stuttaford et al. | |
| 2016/0169110 A1 | 6/2016 | Myers et al. | |
| 2016/0230993 A1 | 8/2016 | Dai et al. | |
| 2017/0082022 A1 * | 3/2017 | Lee | F02C 7/04 |
| 2017/0138266 A1 | 5/2017 | Caples | |
| 2017/0145852 A1 | 5/2017 | McCune et al. | |
| 2017/0284298 A1 | 10/2017 | Suciu et al. | |
| 2017/0298822 A1 * | 10/2017 | Garde La Casa | F02C 7/10 |
| 2017/0350590 A1 | 12/2017 | Choudhri et al. | |
| 2017/0356656 A1 | 12/2017 | Ogata et al. | |
| 2018/0003388 A1 | 1/2018 | Park | |
| 2018/0010795 A1 | 1/2018 | Nath et al. | |
| 2018/0051710 A1 | 2/2018 | Takamura et al. | |
| 2018/0058224 A1 | 3/2018 | Jennings et al. | |
| 2018/0058331 A1 | 3/2018 | Barton et al. | |
| 2018/0058404 A1 | 3/2018 | Tibbs | |
| 2018/0100437 A1 | 4/2018 | Dicintio et al. | |
| 2018/0134407 A1 | 5/2018 | Elbibary et al. | |
| 2018/0154446 A1 | 6/2018 | Brown et al. | |
| 2018/0170575 A1 | 6/2018 | Ziarno | |
| 2018/0172271 A1 | 6/2018 | Moniz et al. | |
| 2018/0179896 A1 | 6/2018 | Pal et al. | |
| 2018/0179956 A1 | 6/2018 | Wertz | |
| 2018/0283692 A1 | 10/2018 | Ryon et al. | |

(56) References Cited

U.S. PATENT DOCUMENTS

| | | |
|---|---|---|
| 2018/0356095 A1 | 12/2018 | Patel et al. |
| 2018/0363555 A1 | 12/2018 | Zelina et al. |
| 2019/0010872 A1 | 1/2019 | Dam et al. |
| 2019/0024897 A1 | 1/2019 | Prociw et al. |
| 2019/0032561 A1 | 1/2019 | Stoia et al. |
| 2019/0178497 A1 | 6/2019 | Jones et al. |
| 2019/0249877 A1 | 8/2019 | Fryer |
| 2020/0080530 A1 | 3/2020 | Freer et al. |
| 2020/0088409 A1 | 3/2020 | Greenfield et al. |
| 2020/0191059 A1 | 6/2020 | Ryon et al. |
| 2020/0309378 A1 | 10/2020 | Dam et al. |
| 2020/0348024 A1 | 11/2020 | Hicks |
| 2021/0215100 A1 | 7/2021 | Head et al. |
| 2022/0007488 A1 | 1/2022 | Bai et al. |

FOREIGN PATENT DOCUMENTS

| | | |
|---|---|---|
| EP | 2189720 A1 | 5/2010 |
| EP | 3128166 A1 | 2/2017 |
| EP | 2677240 B1 | 4/2020 |
| FR | 970988 A | 1/1951 |
| FR | 1218296 A | 5/1960 |
| GB | 693846 A | 7/1953 |
| GB | 791990 A | 3/1958 |
| GB | 819141 A | 8/1959 |
| GB | 859184 A | 1/1961 |
| JP | 2015021715 A | 2/2015 |
| KR | 101279722 B1 | 6/2013 |

OTHER PUBLICATIONS

Extended European Search Report for EP Application No. 21216163.2, dated May 16, 2022, pp. 8.

"Metal Seal Design Guide—High Performance Engineered Seals and Sealing Systems", from Parker Hannlfin Corporation Composite Sealing Systems Division, 2016, 106 pages.

Database WPI—2017 Clarivate Analytics, Week 201919, Thomson Scientific, London GB; AN 2019-17673X XP002806356, 2 pages.

Extended European Search Report for EP Application No. 21192156.4, dated Feb. 1, 2022, 7 pages.

Extended European Search Report for EP Application No. 21201782.6, dated Mar. 28, 2022, 10 pages.

Extended European Search Report for EP Application No. 21205035.5, dated Mar. 28, 2022, 9 pages.

Extended European Search Report for EP Application No. 21205393.8, dated Mar. 17, 2022, 8 pages.

Extended European Search Report for EP Application No. 21212869.8, dated Apr. 28, 2022, pp. 7.

Extended European Search Report for EP Application No. 21213899.4, dated May 6, 2022, 8 pages.

Extended European Search Report for EP Application No. 21214138.6, dated Apr. 25, 2022, 7 pages.

Extended European Search Report for EP Application No. 21214511.4, dated Apr. 29, 2022, 8 pages.

Extended European Search Report for EP Application No. 21214798.7, dated May 11, 2022, 8 pages.

Extended European Search Report for EP Application No. 21214894.4, dated May 3, 2022, 9 pages.

Extended European Search Report for EP Application No. 21215655.8, dated May 2, 2022, 8 pages.

Extended European Search Report for EP Application No. 21215709.3, dated May 12, 2022, 9 pages.

Extended European Search Report for EP Application No. 21209057.5, dated Jul. 19, 2022, 8 pages.

Communication Pursuant to Article 94(3) EPC for EP Application No. 21216163.2, dated May 12, 2023, pp. 7.

First Communication Pursuant to Article 94(3) EPC for EP Application No. 21215655.8, dated Aug. 18, 2023, pp. 4.

* cited by examiner

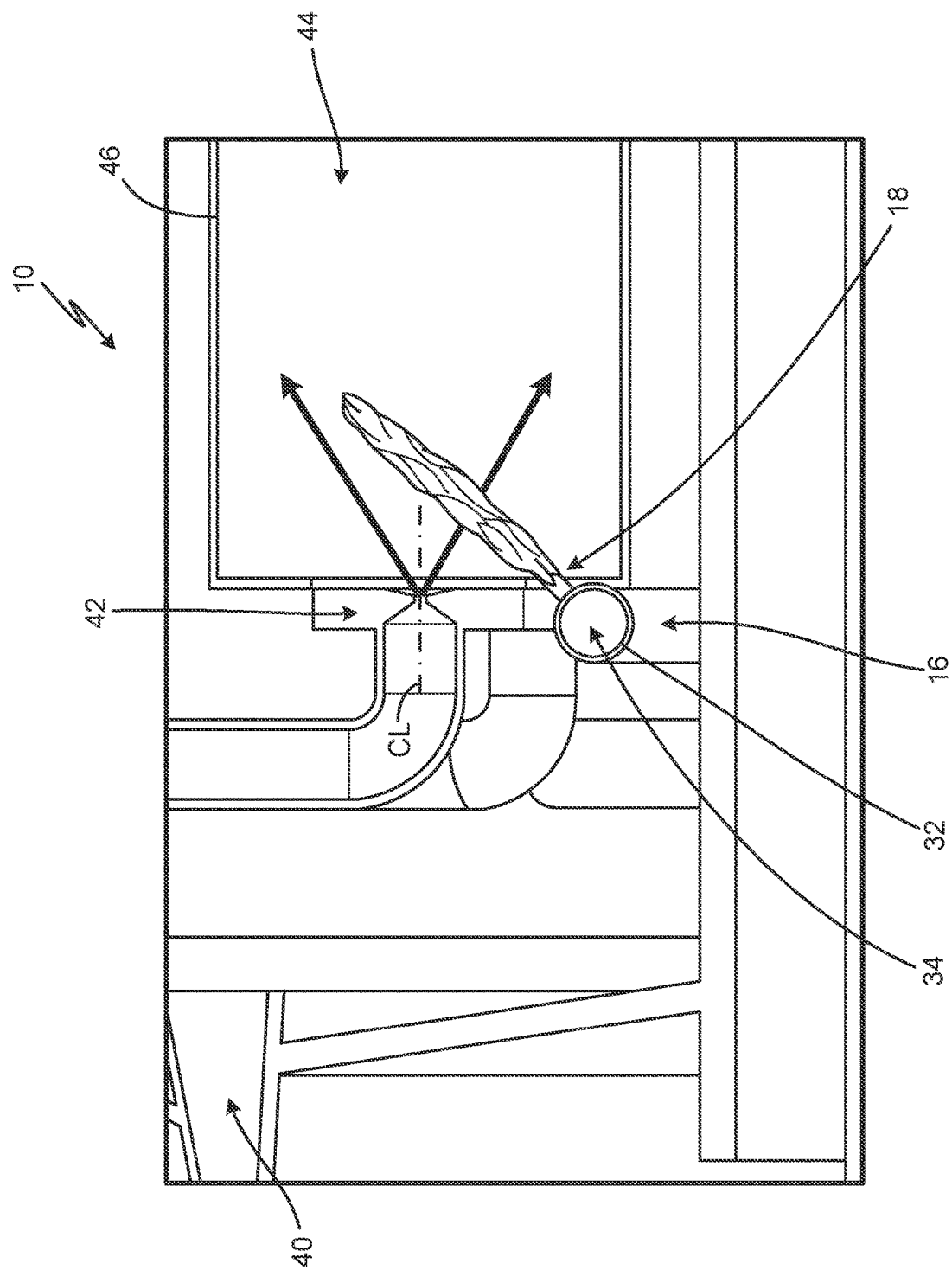

CONTINUOUS IGNITION DEVICE EXHAUST MANIFOLD

CROSS-REFERENCE TO RELATED APPLICATION(S)

This application is a continuation of application Ser. No. 17/123,741, entitled "CONTINUOUS IGNITION DEVICE EXHAUST MANIFOLD" filed Dec. 16, 2020, which is herein incorporated by reference.

BACKGROUND

The present disclosure relates to continuous ignition devices within gas turbine engines, and more particularly to an exhaust manifold used with a continuous ignition device within a gas turbine engine.

Torch ignitors can be used in lieu of spark ignitors to provide an ignition source for combustors located in gas turbine engines. Torch ignitors provide a flame to the combustor of a gas turbine engine as an ignition source rather than the electric current provided by spark ignitors. Consequently, torch ignitors can provide a larger target for fuel injectors within the combustor, allowing for utilization of a greater range of fuel injector designs. Traditionally, torch ignitors include a single torch or flame jetting into the combustor of the gas turbine engine to ignite the fuel sprayed from the fuel nozzles within the gas turbine engine.

SUMMARY

According to one aspect of the disclosure, a torch ignitor system for use with a gas turbine engine including a high-pressure compressor, a high-pressure case, fuel nozzles, and a combustor is disclosed. The torch ignitor system includes a torch ignitor, a manifold, and a combustion chamber. The torch ignitor is coupled to the high-pressure case of the gas turbine engine. The manifold is positioned within the high-pressure case and the manifold includes a plurality of torch nozzles extending from the manifold into the combustor of the gas turbine engine. The combustion chamber is positioned within the high-pressure case and the combustion chamber includes a first end coupled to the torch ignitor and a second end coupled and fluidly connected to the manifold. The combustion chamber is configured such that in operation, an ignited fuel and air mixture flows through the combustion chamber, into and through the manifold, and exits through each of the plurality of torch nozzles into the combustor of the gas turbine engine.

According to another aspect of the disclosure, a method of igniting fuel within a combustor of a gas turbine engine including a high-pressure compressor, a high-pressure case, fuel nozzles, and a combustor is disclosed. The method including: igniting, by a torch ignitor of a torch ignitor system, a fuel and air mixture within a combustion chamber of the torch ignitor system, wherein the torch ignitor is coupled to the high-pressure case of the gas turbine engine; flowing the ignited fuel and air mixture through the combustion chamber from a first end of the combustion chamber to a second end of the combustion chamber, wherein the first end is coupled to the torch ignitor and the second end is coupled and fluidly connected to a manifold, and wherein the combustion chamber is positioned within the high-pressure case of the gas turbine engine; flowing the ignited fuel and air mixture from the second end of the combustion chamber into and through the manifold, wherein the manifold is positioned within the high-pressure case of the gas turbine engine; and flowing the ignited fuel and air mixture from the manifold through a plurality of torch nozzles extending from the manifold into the combustor of the gas turbine engine, wherein the ignited fuel and air mixture exits the torch nozzles into the combustor and ignites the fuel sprayed from the fuel nozzles into the combustor of the gas turbine engine.

BRIEF DESCRIPTION OF THE DRAWINGS

FIG. 2B-1 shows a section of the manifold including an inner skin, an outer skin and vanes between the inner skin and outer skin.

FIG. 2C is a side cross-sectional view of the torch ignitor system in operation.

DETAILED DESCRIPTION

Figure 1A:
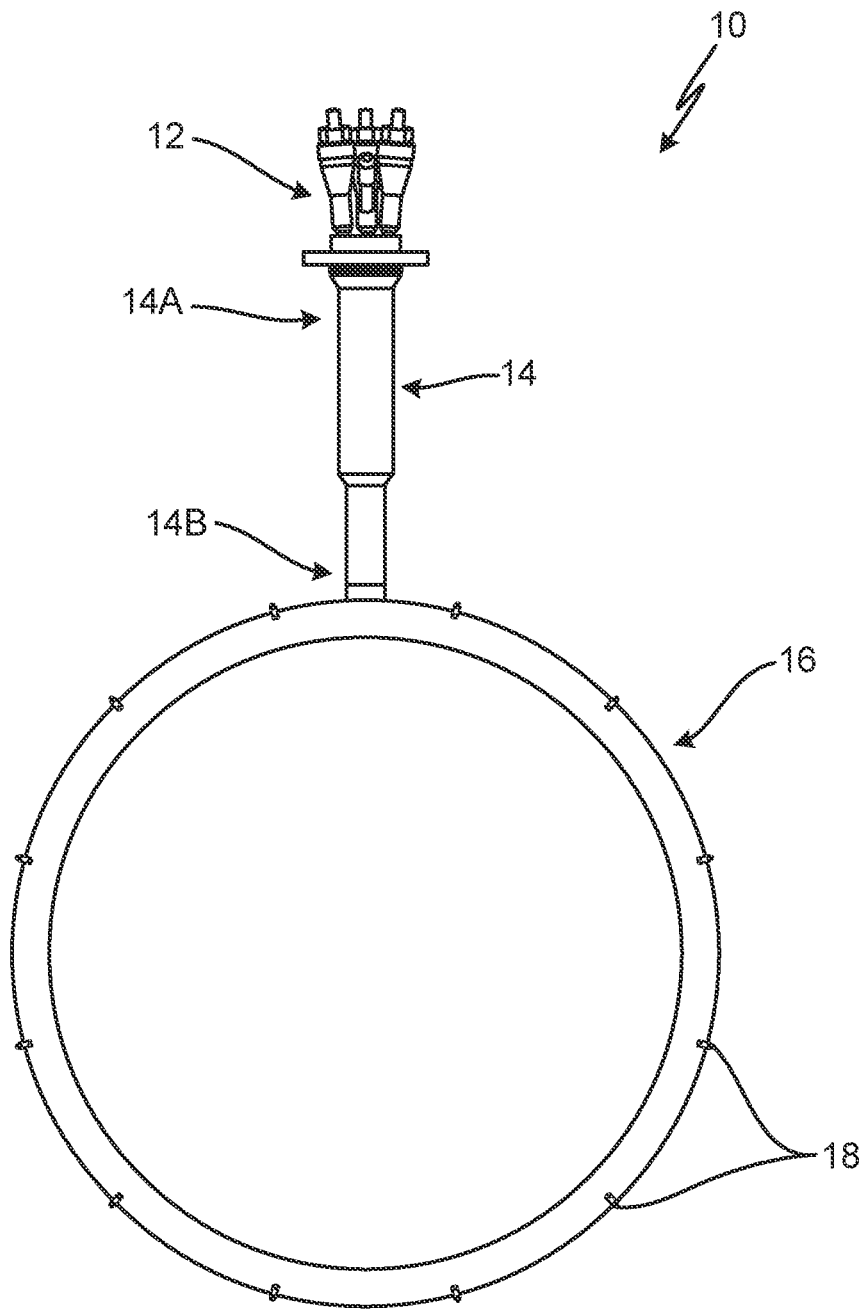
FIG. 1A is a front view of a torch ignitor system including a manifold.
Figure 1B:
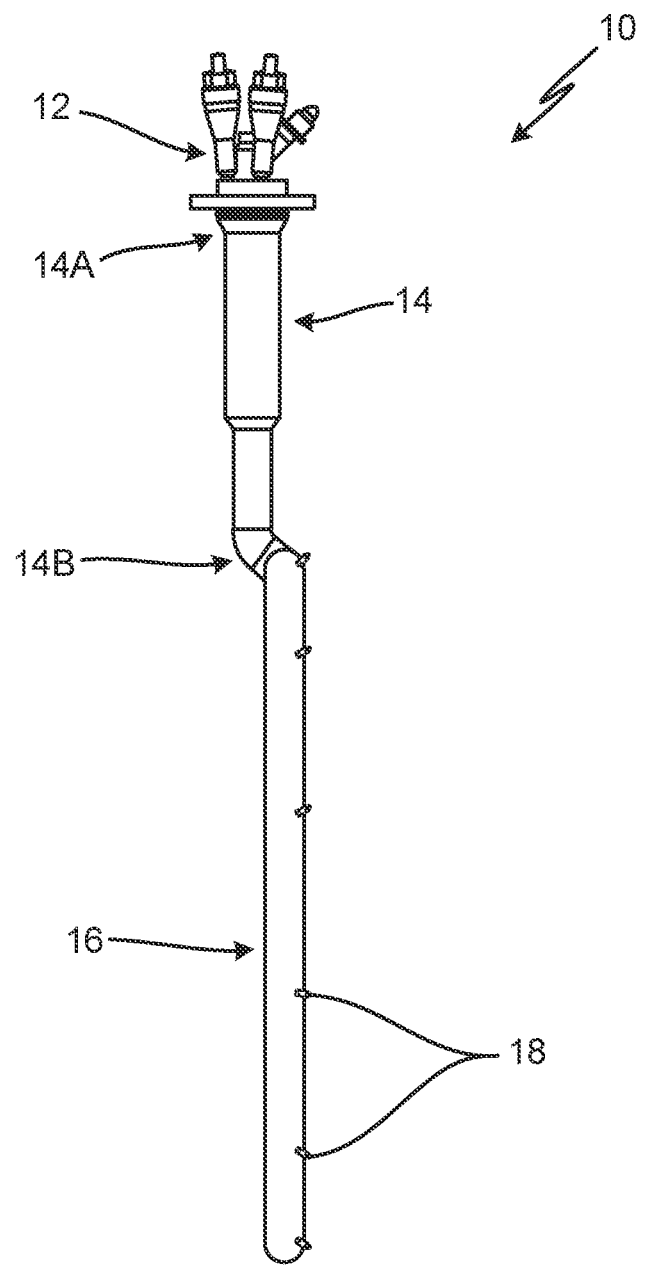
FIG. 1B is a side view of a torch ignitor system including a manifold.
Figure 1C:
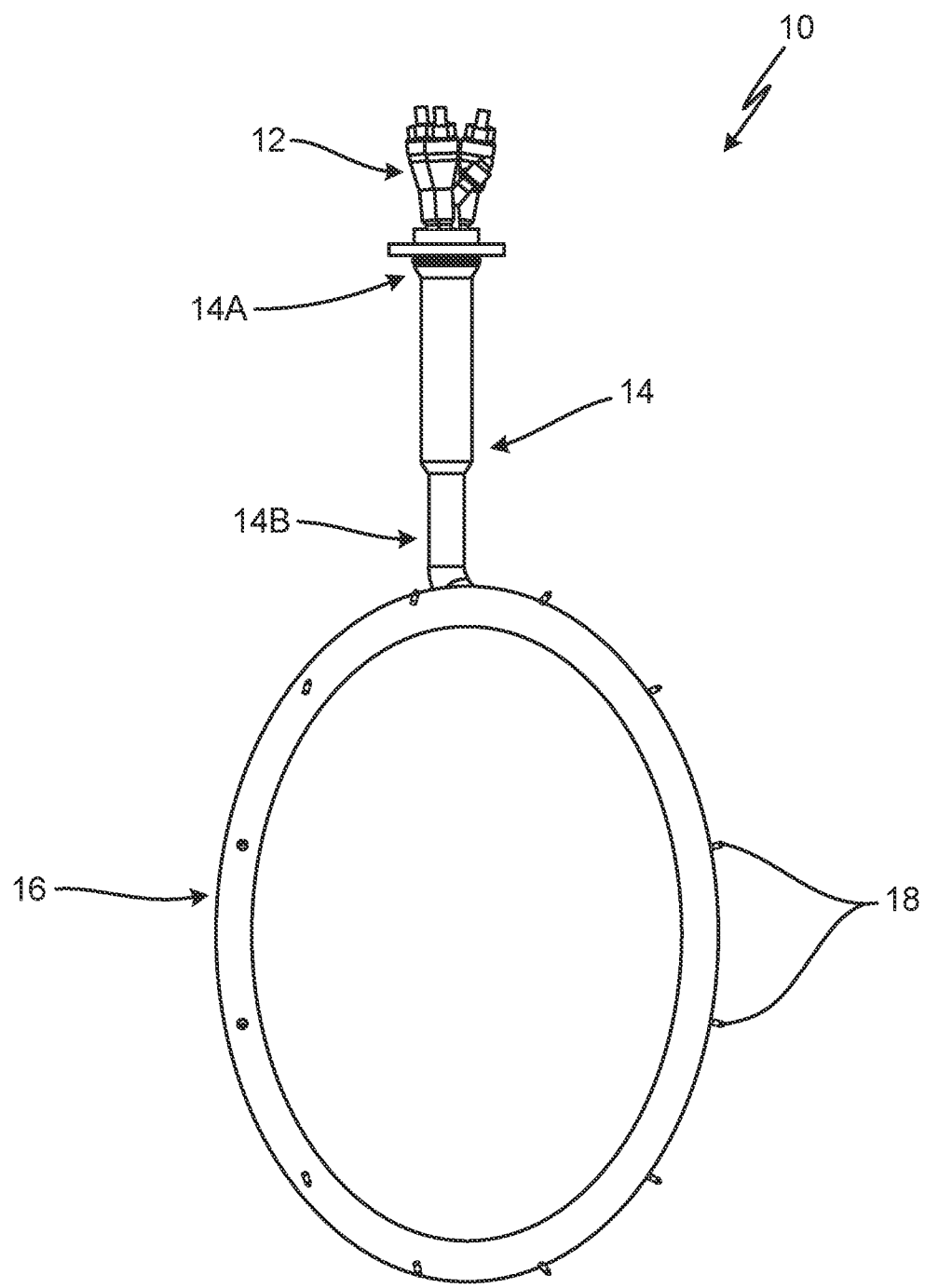
FIG. 1C is a perspective view of a torch ignitor system including a manifold.
Figure 2A:
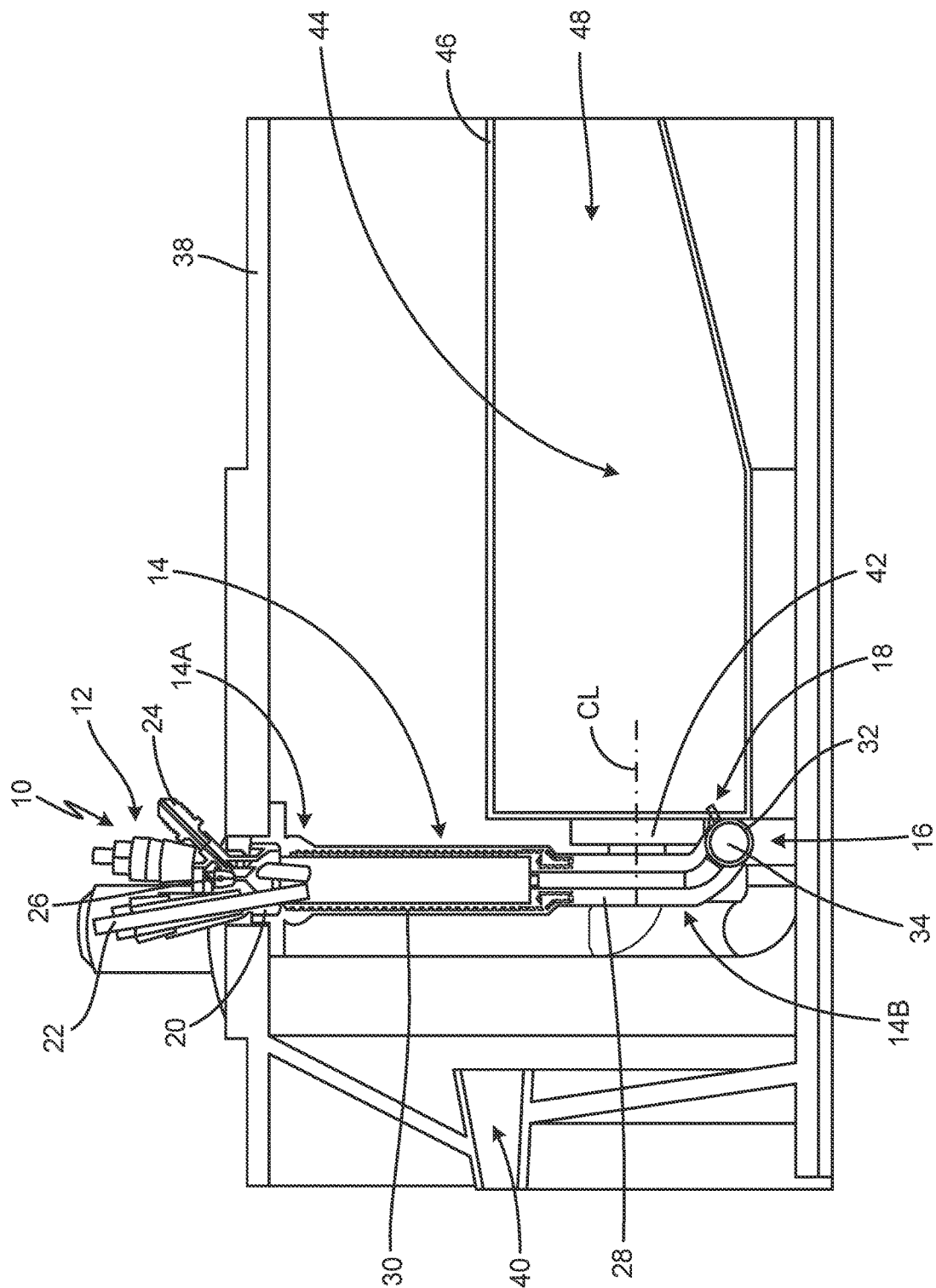
FIG. 2A is a cross-sectional view of the torch ignitor system within a gas turbine engine.
Figure 2B:
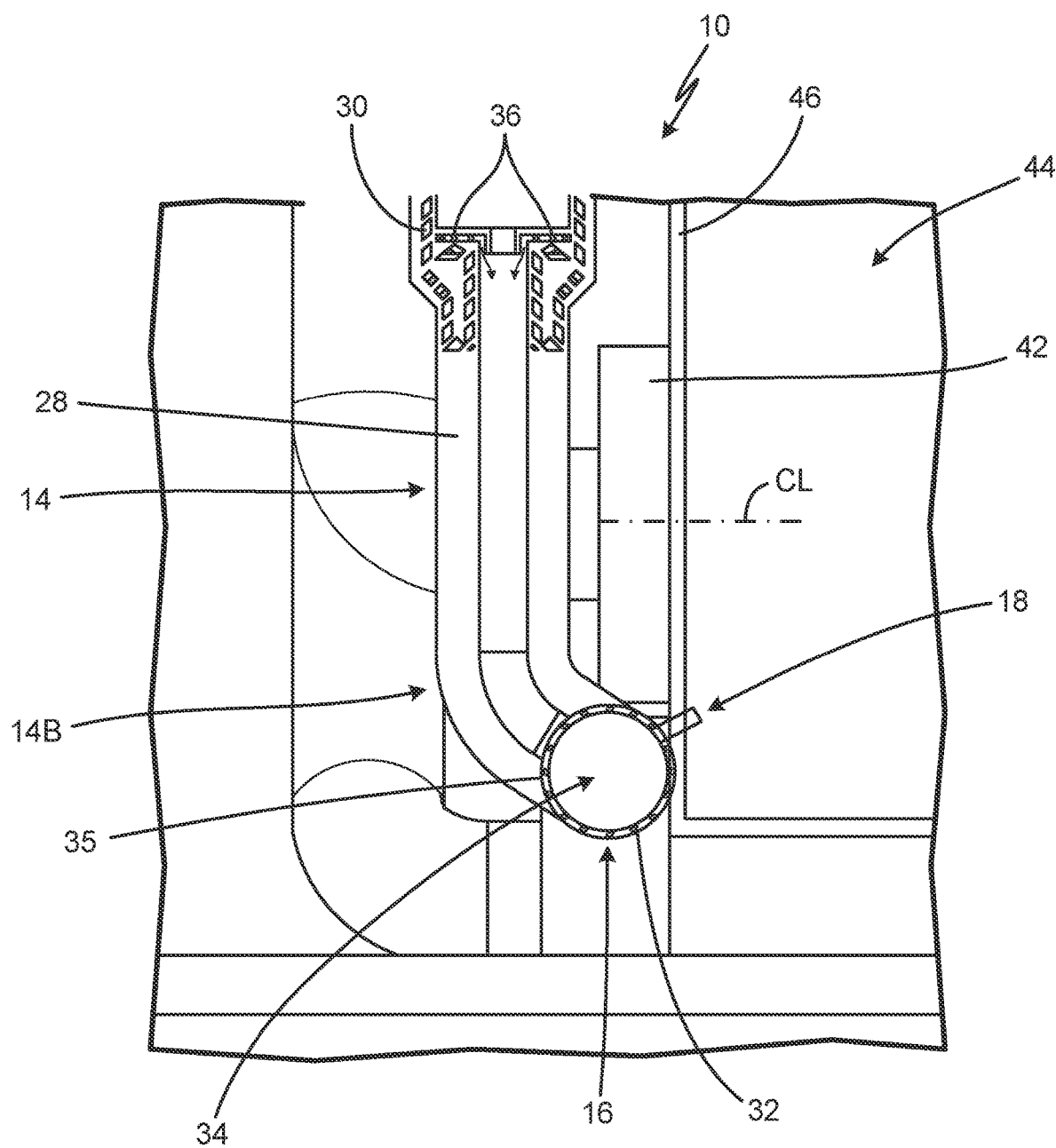
FIG. 2B is a close-up cross-sectional view of a portion of FIG. 2A.

FIG. 1A is a front view of torch ignitor system 10. FIG. 1B is a side view of torch ignitor system 10. FIG. 1C is a perspective view of torch ignitor system 10. FIG. 2A is a cross-sectional view of torch ignitor system 10 within a gas turbine engine. FIG. 2B is a close-up cross-sectional view of a portion of torch ignitor system 10 within the gas turbine engine. FIG. 2C is a side cross-sectional view of an operational torch ignitor system 10 within the gas turbine engine (with combustion chamber 14 removed for clarity). FIGS. 1A-2C will be discussed together. Torch ignitor system 10 is a continuous ignition device used to ignite a fuel and air mixture within a combustor of a gas turbine engine (not shown). Torch ignitor system 10 includes torch ignitor 12, combustion chamber 14, manifold 16, and torch nozzles 18. Torch ignitor 12 includes housing 20, hot surface ignitors 22, fuel inlet 24 (FIG. 2A), and air inlet 26 (FIG. 2A). Combustion chamber 14 includes first end 14A, second end 14B, outer body 28, vanes 30, and quenching aperture 36 (FIG. 2B). Manifold 16 includes (shown in FIG. 2C) outer wall 32, interior 34, and vanes (not shown). Torch nozzles 18 are coupled to and extend outwards from manifold 16.

Torch ignitor 12 includes housing 20, hot surface ignitors 22, fuel inlet 24 (FIG. 2A), and air inlet 26 (FIG. 2A). Housing 20 is the main body portion of torch ignitor 12 that provides structure for the other components of torch ignitor 12 to be coupled. Housing 20 can be constructed from a nickel-chromium alloy, a nickel-chromium-iron-molybdenum alloy, a 300-series stainless steel alloy, or other high-temperature high-strength metallic or nonmetallic material that can withstand the high temperature environment within a gas turbine engine. Hot surface ignitors 22 extend through and are coupled to housing 20 of torch ignitor 12. More specifically, hot surface ignitors 22 are coupled to housing 20 such that a portion of each of the hot surface ignitors 22 is within housing 20 and another portion of each of the hot surface ignitors 22 is outside of housing 20. Hot surface ignitors 22 are electrical resistance heating elements that are configured to receive a positive and negative electric charge in the form of an electric current to increase the temperature of the element due to the resistive properties of the electrical resistance heating elements. In some examples, hot surface ignitors 22 can be constructed from a ceramic material with resistive properties allowing hot surface ignitors 22 to achieve a temperature that exceeds the ignition temperature of a fuel and air mixture within torch ignitor system 10 of the gas turbine engine. In the embodiment shown there are three hot surface ignitors 22, but in another embodiment, there can be more than or less than three hot surface ignitors 22.

Fuel inlet 24 (FIG. 2A) is coupled to an upper side portion of housing 20 at an oblique angle through standard attachment techniques, such as a mating threaded engagement. Fuel inlet 24 provides a flow path for fuel to enter housing 20 of torch ignitor 12 to be ignited by hot surface ignitors 22. The portion of fuel inlet 24 positioned outside of housing 20 is configured to receive fuel from a fuel source and the portion of fuel inlet 24 positioned within housing 20 is configured to distribute or spray the received fuel into housing 20. In the embodiment shown, fuel inlet 24 receives fuel from the main fuel source that supplies fuel to the gas turbine engine. In another embodiment, fuel inlet 24 can receive fuel from a separate fuel source other than the main fuel source that supplies fuel to the gas turbine engine. Air inlet 26 is positioned within and coupled to housing 20. Air inlet 26 is configured to receive pressurized air from an air source within the gas turbine engine and distribute the pressurized air into housing 20. More specifically, air inlet 26 is configured to receive the pressurized air and meter or regulate the amount of air entering housing 20 to ensure the proper ratio of fuel and air is mixed within housing 20 and ignited by hot surface ignitors 22. Further, the pressurized air entering housing 20 through air inlet 26 is utilized to atomize the fuel entering housing 20 through fuel inlet 24 to produce an efficient burn of the fuel and air mixture, as compared to non-atomized fuel. Torch ignitor 12 is configured to receive fuel from a fuel source and air from an air source, mix the fuel and air into a fuel and air mixture, and ignite the fuel and air mixture as it enters combustion chamber 14. As shown in FIGS. 1A-1C, a lower portion of torch ignitor 12 is adjacent and coupled to combustion chamber 14 to distribute the ignited fuel and air mixture into combustion chamber 14.

Combustion chamber 14 is a tube, passage, channel, or the like including a hollow center portion configured to allow fluid, such as an ignited fuel and air mixture, to flow through combustion chamber 14. In the embodiment shown, combustion chamber 14 is a round tube with a hollow center portion. In another embodiment, combustion chamber 14 can be a tube of any geometric shape with a hollow center portion allowing a fluid, such as an ignited fuel and air mixture, to flow through the hollow center portion. Combustion chamber 14 can be constructed from a nickel-chromium alloy, a nickel-chromium-iron-molybdenum alloy, a 300-series stainless steel alloy, or other high-temperature high-strength metallic or nonmetallic material that can withstand the high temperature environment within a gas turbine engine. Combustion chamber 14 includes first end 14A, second end 14B, outer body 28, vanes 30, and quenching apertures 36 (FIG. 2B).

First end 14A of combustion chamber 14 is adjacent and coupled to the lower portion of torch ignitor 12. Second end 14B of combustion chamber 14 is adjacent and coupled to manifold 16. Combustion chamber 14 is in fluid communication with both torch ignitor 12 and manifold 16, fluidly connecting torch ignitor 12 to manifold 16. More specifically, combustion chamber 14 is configured to provide a flow passage or flow path for the ignited fuel and air mixture to flow from torch ignitor 12, through combustion chamber 14, and into manifold 16. As such, combustion chamber 14 is configured to allow the ignited fuel and air mixture to flow from torch ignitor 12 directly into manifold 16 of torch ignitor system 10. As shown in FIGS. 1A-1B, combustion chamber 14 includes a larger diameter portion adjacent first end 14A and a smaller diameter portion adjacent second end 14B. The smaller diameter portion adjacent second end 14B is configured to constrict the flow of the ignited fuel and air mixture before the ignited fuel and air mixer enters manifold 16, increasing the pressure and velocity of the ignited fuel and air mixture as it enters manifold 16. In the embodiment shown, combustion chamber 14 includes the smaller diameter portion adjacent second end 14B of combustion chamber 14. In another embodiment, combustion chamber 14 can have a constant diameter extending from first end 14A to second end 14B of combustion chamber 14.

Figure 1D:
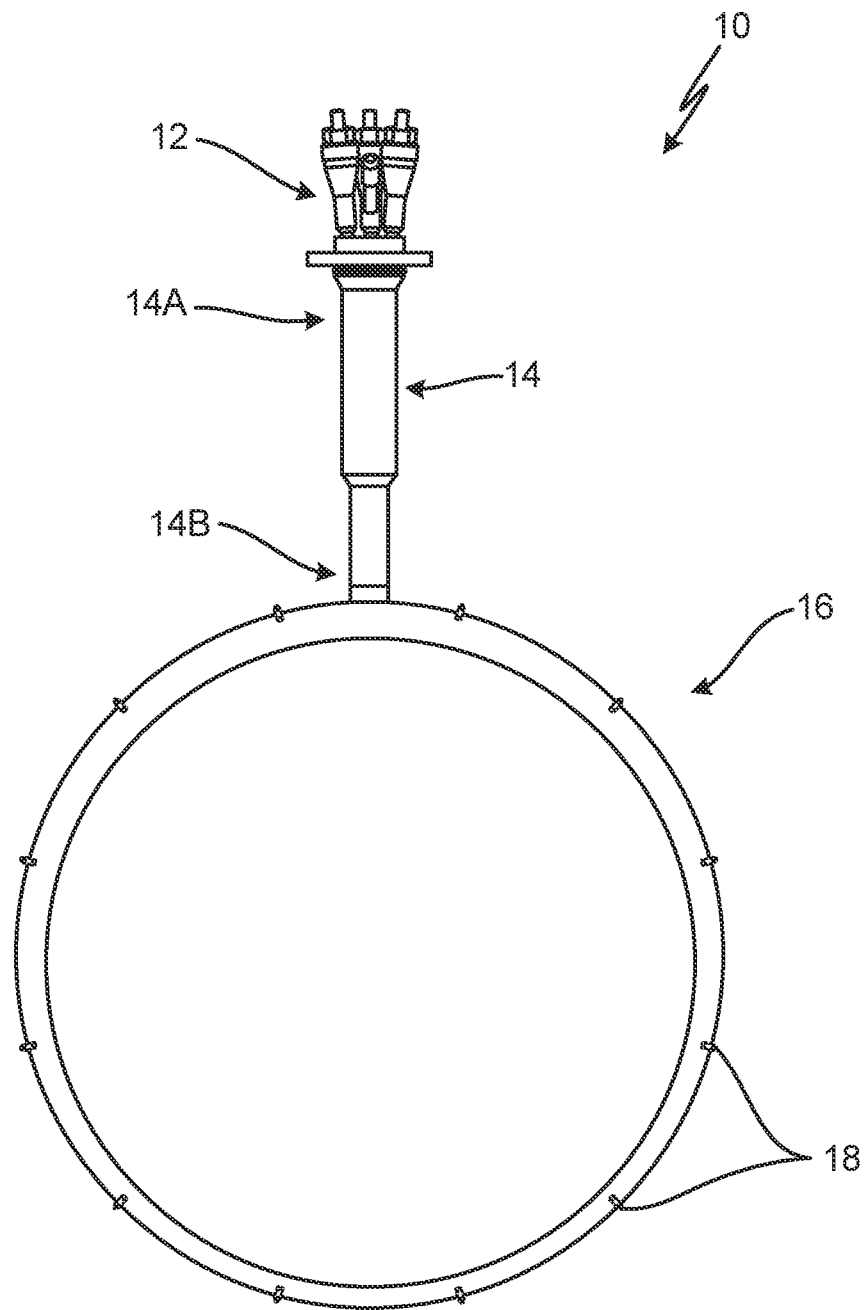
FIG. 1D is a front view of a torch ignitor system including a manifold with a cross-sectional area that decreases from a location near where the manifold is coupled to a combustion chamber to a location positions farthest away from the location near where the manifold is coupled to a combustion chamber.

Manifold 16 is a circular tube, passage, channel, or the like including a hollow center portion configured to allow fluid, such as an ignited fuel and air mixture, to flow through manifold 16. In other words, manifold 16 is a torus shaped tube including a round cross-section that is configured to allow an ignited fuel and air mixture to flow through a hollow center portion of manifold 16. In the embodiment shown, manifold 16 is a round tube with a hollow center portion. In another embodiment, manifold 16 can be a tube with a cross-section of any geometric shape (e.g. square, triangular, oval, trapezoidal, etc.) including a hollow center portion allowing a fluid, such as an ignited fuel and air mixture, to flow through the hollow center portion. In yet another embodiment, shown in FIG. 1D, manifold 16 can include a gradually decreasing cross-sectional area extending from the location where manifold 16 interfaces with combustion chamber 14 to the location positioned farthest away from the location where manifold 16 interfaces with combustion chamber 14. A gradually decreasing cross-sectional area of manifold 16 ensures more uniform velocities of the ignited fuel and air mixture flowing through manifold 16, as portions of the ignited fuel and air mixture exit from manifold 16 through torch nozzles 18. Manifold 16 can be constructed from a nickel-chromium alloy, a nickel-chromium-iron-molybdenum alloy, a 300-series stainless steel alloy, or other high-temperature high-strength metallic or nonmetallic material that can withstand the high temperature environment within a gas turbine engine. Manifold 16 includes outer wall 32 and interior 34 (FIG. 2B).

Figures 1, 2B:
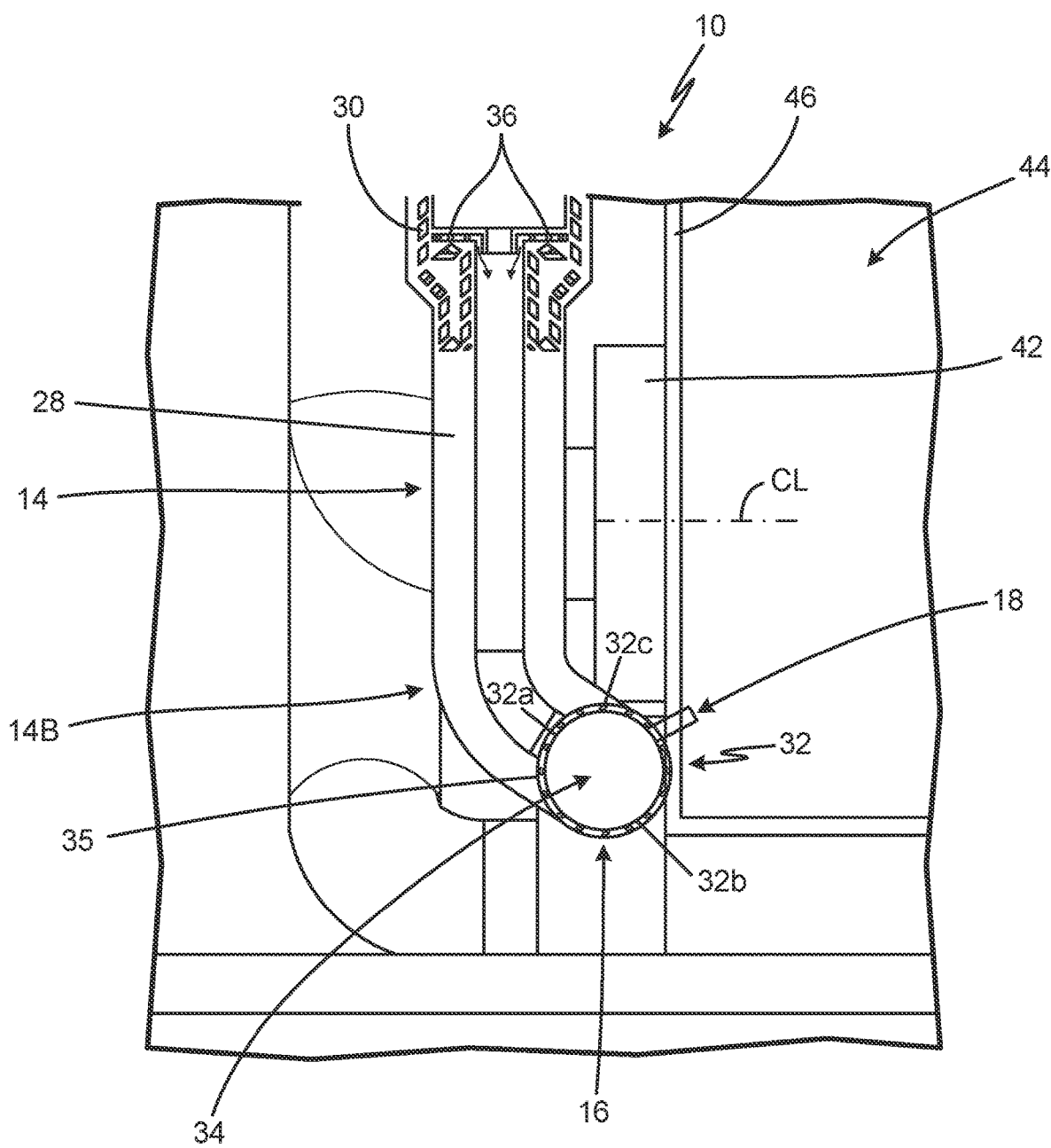
Figure 2D:
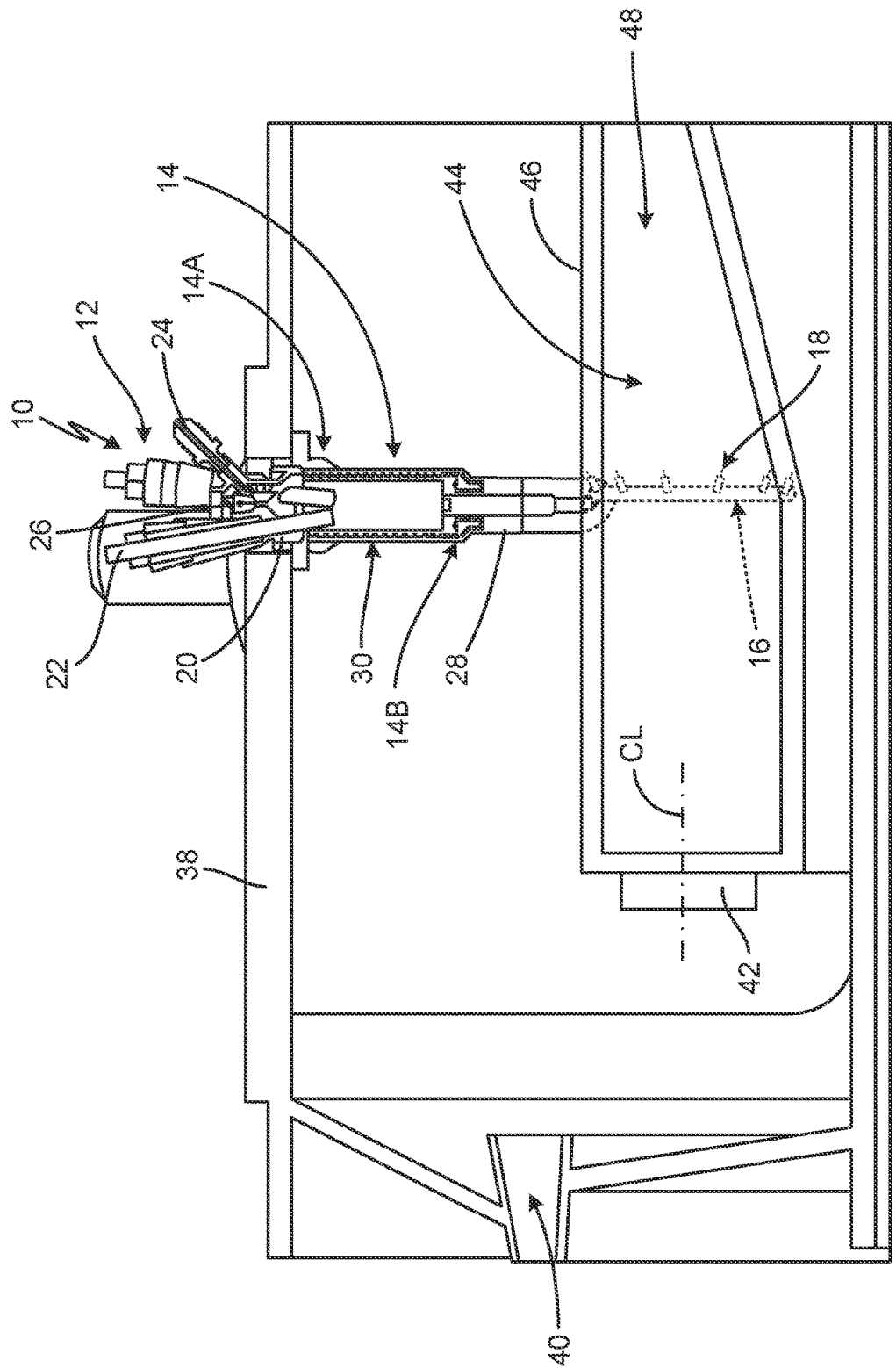
FIG. 2D is a cross-sectional view of the torch ignitor system within a gas turbine engine, including a manifold surrounding an outer surface of a combustor halfway down the combustor.
Figure 2E:
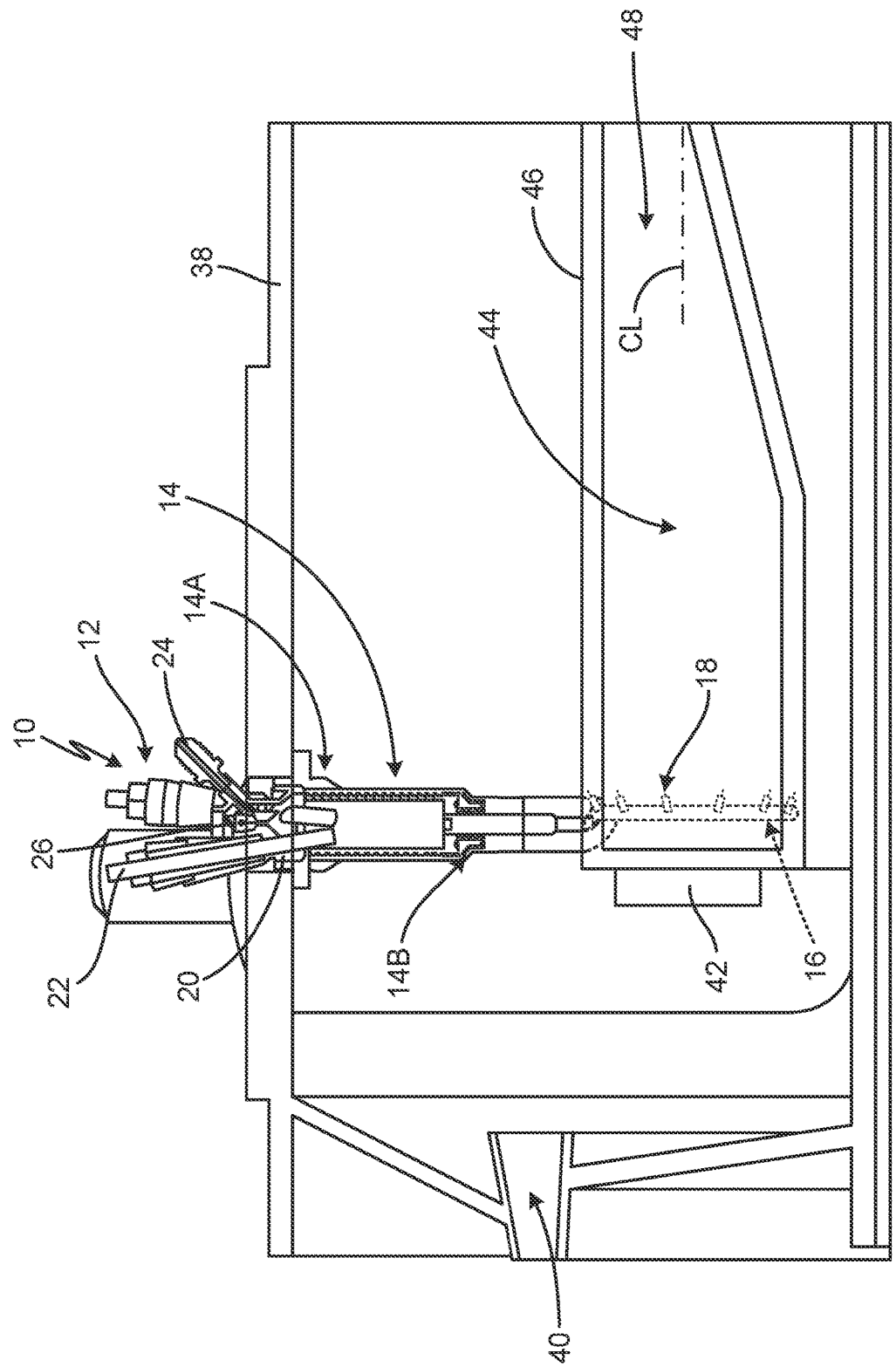
FIG. 2E is a cross-sectional view of the torch ignitor system within a gas turbine engine, including a manifold surrounding an outer surface of a combustor and a plurality of torch nozzles extending into the combustor adjacent a corner of a combustion liner.
Figure 2F:
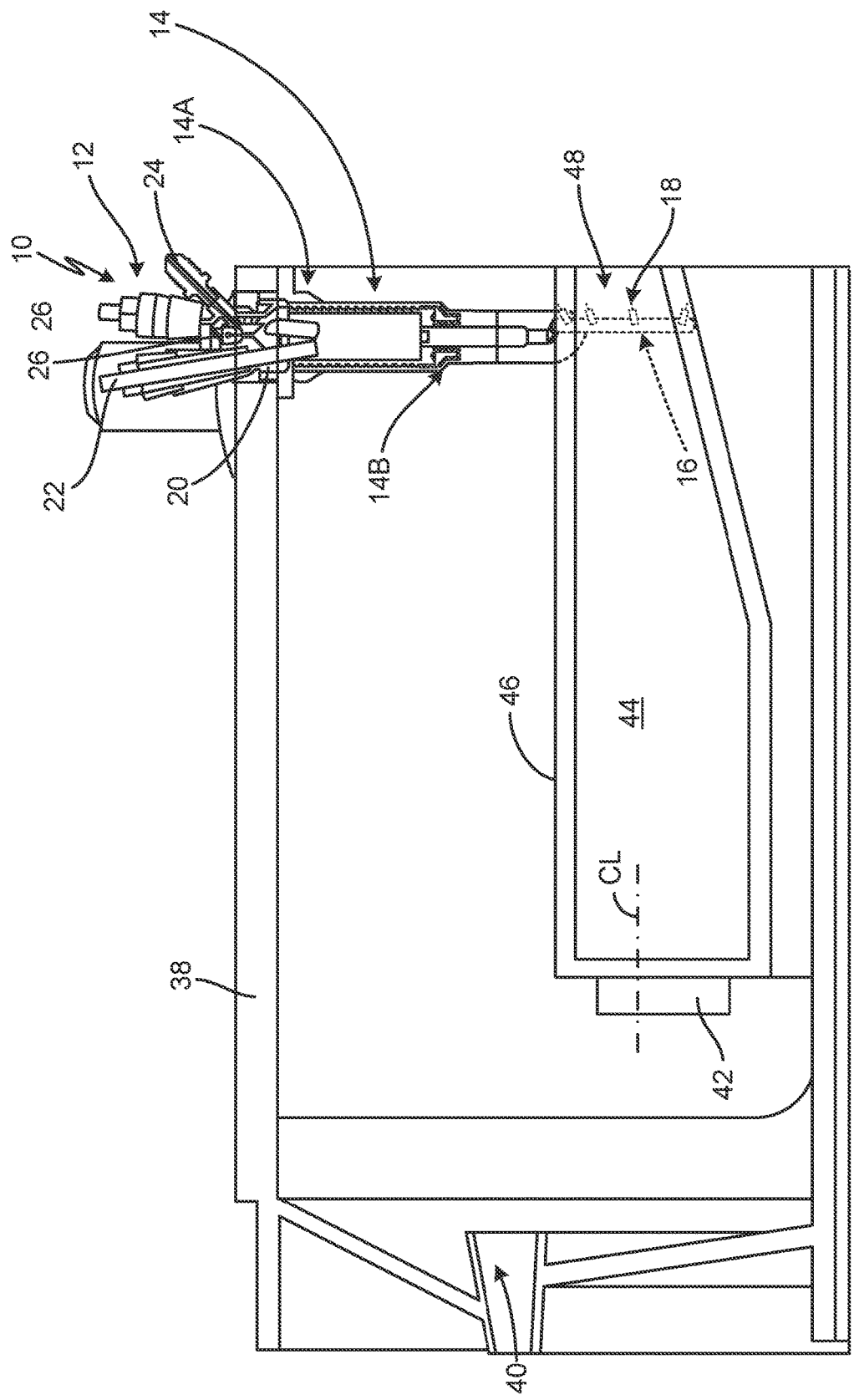
FIG. 2F is a cross-sectional view of the torch ignitor system within a gas turbine engine, including a manifold surrounding an outer surface of a combustor and a plurality of torch nozzles extending into the combustor adjacent a combustor outlet.

Outer wall 32 of manifold 16 is the main body portion or structural portion of manifold 16. As shown in FIG. 2B-1, outer wall 32 includes an inner skin 32a and an outer skin 32b, with the volume within the inner skin 32a defining interior 34 of manifold 16. Interior 34 is the space or volume within manifold 16 in which an ignited fuel and air mixture will be contained and flow through during operation of torch ignitor system 10. Outer wall 32 is a component of manifold 16, and thus can be constructed from a nickel-chromium alloy, a nickel-chromium-iron-molybdenum alloy, a 300-series stainless steel alloy, or other high-temperature high-strength metallic or nonmetallic material that can withstand the high temperature environment within a gas turbine engine.

Torch nozzles 18 are coupled to outer wall 32 of manifold 16 and extend outwards from outer wall 32 in the opposite direction as interior 34 of manifold 16. In the embodiment shown, torch nozzles 18 are coupled to manifold 16 through standard connection techniques, such as brazing, welding, etc. In another embodiment, torch nozzles 18 and manifold 16 can be of uniform construction, such that torch nozzles 18 and manifold 16 are a single-piece material manufactured to form a monolithic component (i.e. through additive manufacturing techniques). Torch nozzles 18 are fluidly connected with interior 34 of manifold 16 and torch nozzles 18 are configured to expel or jet an ignited fuel and air mixture from interior 34 of manifold 16 outwards through torch nozzles 18. In other words, torch nozzles 18 are configured to control the direction and velocity of an ignited fuel and air mixture as it exits interior 34 of manifold 16 and enters a combustor of the gas turbine engine.

In the embodiment shown, there are twelve torch nozzles 18 spaced equidistant about outer wall 32 of manifold 16. In another embodiment, there can be more than or less than twelve torch nozzles 18 spaced equidistant about outer wall 32 of manifold 16, the number of torch nozzles 18 can vary depending on the pressure and flow characteristics within torch ignitor system 10. Further, in the embodiment shown, torch nozzles 18 extend from outer wall 32 at about a 45-degree angle. In another embodiment, torch nozzles 18 can extend from outer wall 32 within an angle range of 0 degrees to 180 degrees. Torch nozzles 18 can be constructed from a nickel-chromium alloy, a nickel-chromium-iron-molybdenum alloy, a 300-series stainless steel alloy, or other high-temperature high-strength metallic or nonmetallic material that can withstand the high temperature environment within a gas turbine engine.

As shown in FIG. 2A, torch ignitor system 10 is positioned within a gas turbine engine including high-pressure case 38, high-pressure compressor region 40, fuel nozzles 42, and combustor 44. Combustor 44 includes combustor liner 46 defining the external walls and an internal chamber of combustor 44. Combustor 44 also includes combustor outlet 48 which is utilized to expel an ignited fuel and air mixture from combustor 44 to be utilized by the gas turbine engine to power the turbine section of the gas turbine engine. In operation, air is compressed within high-pressure compressor region 40 to create high-pressure air, the high-pressure air flows from high-pressure compressor region 40 into combustor 44 and mixes with fuel spraying from fuel nozzles 42 into combustor 44, the fuel and air mixture is ignited by torch ignitor system 10, and then the ignited fuel and air mixture is expelled through combustor outlet 48 to be utilized by the gas turbine engine.

Torch ignitor system 10 is positioned at least partially within high-pressure case 38 of the gas turbine engine. High-pressure compressor region 40, fuel nozzles 42, and combustor 44 are positioned within and fully contained by high-pressure case 38. More specifically, a portion of torch ignitor 12 is positioned within high-pressure case 38 and another portion of torch ignitor 12 is positioned outside of high-pressure case 38. In contrast, combustion chamber 14, manifold 16, and torch nozzles 18 of torch ignitor system 10 are positioned within and fully contained by high-pressure case 38. In addition, combustion chamber 14 and manifold 16 are positioned adjacent high-pressure compressor region 40, fuel nozzles 42, and combustor 44 of the gas turbine engine. In some embodiments, combustion chamber 14 and manifold 16 are positioned between high-pressure compressor region 40 and combustor 44 of the gas turbine engine. In the embodiment shown, torch ignitor 12 is positioned partially within high-pressure case 38 and partially outside of high-pressure case 38. In another embodiment, torch ignitor 12 can be positioned fully within high-pressure case 38 of the gas turbine engine. The remaining disclosure will focus on the embodiment in which torch ignitor 12 is positioned partially within high-pressure case 38 and partially outside of high-pressure case 38, as shown in FIGS. 2A-2C.

As best shown in FIG. 2B, combustion chamber 14 includes second end 14B, outer body 28, and vanes 30. Second end 14B of combustion chamber 14 is coupled to manifold 16 and second end 14B fluidly connects combustion chamber 14 to manifold 16. In one example, combustion chamber 14 can be rigidly coupled to manifold 16 to secure combustion chamber 14 to manifold 16. In another example, combustion chamber 14 can be coupled to manifold 16 through a sliding joint engagement, allowing combustion chamber 16 and manifold 14 to move with respect to each other, accounting for different thermal expansion characteristics of combustion chamber 14 and manifold 16. Outer body 28 of combustion chamber 14 is the outer structure or outer body of combustion chamber 14. In the embodiment shown, outer body 28 includes vanes 30 positioned within and throughout outer body 28 of combustion chamber 14. More specifically, outer body 28 includes an inner and outer skin with a plurality of vanes 30 positioned between the inner and outer skin. The plurality of vanes 30 can be oriented such that a fluid flow path exists between the inner and outer skin, allowing a fluid (i.e. cooling air) to flow through the outer walls and past the plurality of vanes 30. In an example, cooling air received from the gas turbine engine can flow past vanes 30 and remove heat from combustion chamber 14, thereby cooling combustion chamber 14 in the process. Cooling combustion chamber 14 can prevent deformation or damage to combustion chamber 14, extending the useful life of combustion chamber 14 within torch ignitor system 10.

In the embodiment shown in FIGS. 2A-2B, vanes 30 are only shown within a portion of outer body 28 of combustion chamber 14. In another embodiment, vanes 30 can be positioned within all of outer body 28 of combustion chamber 14, such that vanes 30 extend to the intersection of combustion chamber 14 and manifold 16. In an embodiment including vanes 30, combustion chamber 14 can be manufactured using additive manufacturing technology to produce the intricate or complex geometry of vanes 30 within outer body 28 of combustion chamber 14. In another embodiment including vanes 30, combustion chamber 14 can be manufactured using standard manufacturing techniques to produce the intricate or complex geometry of vanes 30. In an embodiment without vanes 30, combustion chamber 14 can be manufactured using standard manufacturing techniques.

It is to be understood that manifold 16 can include vanes 32c within an inner 32a and outer 32b skin of outer wall 32 similar to vanes 30 within outer body 28 of combustion chamber 14. Vanes 32c within outer wall 32 of manifold 16 could be utilized to cool manifold 16 to prevent deformation or damage to manifold 16, extending the useful life of manifold 16 within torch ignitor system 10. In an embodiment including vanes 32c within outer walls 32, manifold 16 can be manufactured using additive manufacturing technology to produce the intricate or complex geometry of the vanes within outer wall 32. In an embodiment without vanes 32c, manifold 16 can be manufactured using standard manufacturing techniques. In another embodiment, manifold 16 could be cooled by including a tube or shell fully surrounding the outer skin of outer wall 32 of manifold 16. The tube or shell could be offset from and concentric with outer wall 32 of manifold 16, creating a space between outer wall 32 and the tube or shell. The space between the two components could be utilized to flow cooling air through to remove heat from manifold 16. In an example, cooling air from a pressurized air source within the gas turbine engine could enter the space between the tube or shell and manifold 16 at a location 180 degrees from combustion chamber 14 and flow through the space, removing heat from manifold 16 as the air flows through the space. In another example, cooling air from a pressurized air source within the gas turbine engine could enter the space between the tube or shell and manifold 16 at any location or angle and flow through the space, removing heat from manifold 16 as the air flows through the space.

As shown in FIG. 2B, combustion chamber 14 can also include quenching aperture 36 positioned within outer body 28 of combustion chamber 14. Quenching aperture 36 provides a cooling air flow path that is configured to distribute cooling air within an interior of outer body 28 of combustion chamber 14. More specifically, quenching aperture 36 is a tube, passage, channel, or the like including a hollow center portion that is configured to receive cooling air from an air source within the gas turbine engine and flow the cooling air into combustion chamber 14. Quenching aperture 36 is configured to cool an ignited fuel and air mixture before the ignited fuel and air mixture exits combustion chamber 14 and flows into manifold 16. Cooling the ignited fuel and air mixture can prevent melting or other damage to manifold 16. In an example, the ignited fuel and air mixture within combustion chamber 14 is about 2,500 degrees Fahrenheit before quenching with cooling air. After quenching with cooling air, the ignited fuel and air mixture can be reduced to a temperature of about 1,500 degrees Fahrenheit, which is a temperature high enough to ignite fuel within combustor 44 but also low enough to prevent melting and damage to manifold 16 and other components of the gas turbine engine.

During operation of torch ignitor system 10, air from air inlet 26 and fuel from fuel inlet 24 are dispensed into and mixed (atomizing the fuel) within housing 20 of torch ignitor 12. The fuel and air mixture flows from housing 20 into first end 14A of combustion chamber 14, where the fuel and air mixture is ignited by hot surface ignitors 22 of torch ignitor 12. The ignited fuel and air mixture (a flame or torch) flows from first end 14A to second end 14B of combustion chamber 14, and into manifold 16. Referring to FIGS. 1C and 2C, the ignited fuel and air mixture flows through interior 34 of manifold 16, following the curvature of the circular tube that constitutes manifold 16 until the ignited fuel and air mixture begins to fill the torus shaped interior 34 of manifold 16. The ignited fuel and air mixture then exits or jets outward from torch nozzles 18 positioned around outer wall 32 of manifold 16. In an example, the jet of ignited fuel and air mixture can exit torch nozzles 18 at an angle such that the ignited fuel and air mixture is aimed towards centerline CL of each of the fuel nozzles 42 to ignite the central recirculation zones of fuel nozzles 42. In another example, the jet of ignited fuel and air mixture can exit torch nozzles 18 at a tangential angle across multiple torch nozzles 18 to simultaneously ignite multiple torch nozzles 18 with a single jet of ignited fuel and air mixture. The ignited fuel and air mixture jets from each of torch nozzles 18 into combustor 44 adjacent each of the fuel nozzles 42 of the gas turbine engine, igniting the fuel dispensing from each of fuel nozzles 42 into combustor 44 of the gas turbine engine.

As such, in the embodiment shown, torch ignitor system 10 is configured to provide an ignited fuel and air mixture adjacent each of the fuel nozzles 42 of the gas turbine engine to easily and efficiently ignite the fuel dispensing from each of the fuel nozzles 42 within the gas turbine engine. In another embodiment, manifold 16 can include a reduced number of torch nozzles 18 strategically placed to ignite more than one fuel nozzle 42 simultaneously. In one example, manifold 16 could include a torch nozzle 18 for every other fuel nozzle 42 of the gas turbine engine, such that each torch nozzle 18 would ignite two fuel nozzles 42 of the gas turbine engine. In another example, manifold 16 could include one torch nozzle 18 for each quadrant of combustor 44, such that each torch nozzle 18 would ignite two or more fuel nozzles 42 of the gas turbine engine. In yet another example, each torch nozzle 18 could be incorporated into a central portion (along centerline CL) of each fuel nozzle 42 of the gas turbine engine to ignite the fuel dispensing from each fuel nozzle 42 of the gas turbine engine. Therefore, torch ignitor system 10 is configured to ignite multiple, or all, fuel nozzles 42 of the gas turbine engine simultaneously, allowing for an easier and more efficient startup of combustor 44 of the gas turbine engine.

In the embodiment shown in FIGS. 1A-2C, the gas turbine engine includes a single torch ignitor 12 and combustion chamber 14 within torch ignitor system 10. In another embodiment, the gas turbine engine can include two or more torch ignitors 12 and combustion chambers 14 within torch ignitor system 10. In an example, torch ignitor system 10 could include a second torch ignitor 12 and second combustion chamber 14 positioned halfway around manifold 16, such that the second torch ignitor 12 and second combustion chamber 14 are positioned 180 degrees around manifold 16 from the first torch ignitor 12 and first combustion chamber 14, respectively. Including two or more torch ignitors 12 and combustion chambers 14 ensures that the ignited fuel and air mixture fully surrounds and flows through the entire interior 34 of manifold 16. Additionally, in the embodiment shown in FIGS. 2A-2C, manifold 16 is positioned between high-pressure compressor region 40 and combustor 44 and the ignited fuel and air mixture jets into combustor 44 adjacent fuel nozzles 42. In another embodiment, shown in FIG. 2D, manifold 16 could surround the outer surface of combustor liner 46 of combustor 44 and torch nozzles 18 could extend into combustor 44 halfway down combustor 44. In yet another embodiment, shown in FIG. 2E, manifold 16 could surround the outer surface of combustor liner 46 of combustor 44 and torch nozzles 18 could extend into combustor 44 adjacent a corner of combustor liner 46. In this embodiment, the manifold 16 is positioned adjacent and axially aft of the location where the fuel nozzles 42 spray fuel into the combustor 44. In yet another embodiment, shown in FIG. 2F, manifold 16 could surround the outer surface of combustor liner 46 of combustor 44 and torch nozzles 18 could extend into combustor 44 adjacent combustor outlet 48. In each embodiment, torch ignitor system 10 is configured to ignite fuel dispensing from fuel nozzles 42 into combustor 44 of the gas turbine engine.

Further, in the embodiment shown, torch ignitor system 10 is configured to ignite fuel dispensing from fuel nozzles 42 of a single annular combustor 44. In another embodiment, torch ignitor system 10 can be used with multiple can combustors with each can combustor having a torch nozzle 18 extending into the can combustor to ignite the fuel dispensing into the can combustor. For example, a gas turbine engine could include six separate can combustors and each can combustor could include a torch nozzle 18 extending into the can combustor to ignite the fuel dispensing into the can combustor. As such, torch ignitor system 10 can simultaneously ignite fuel within multiple can combustors of a gas turbine engine.

Figure 3:
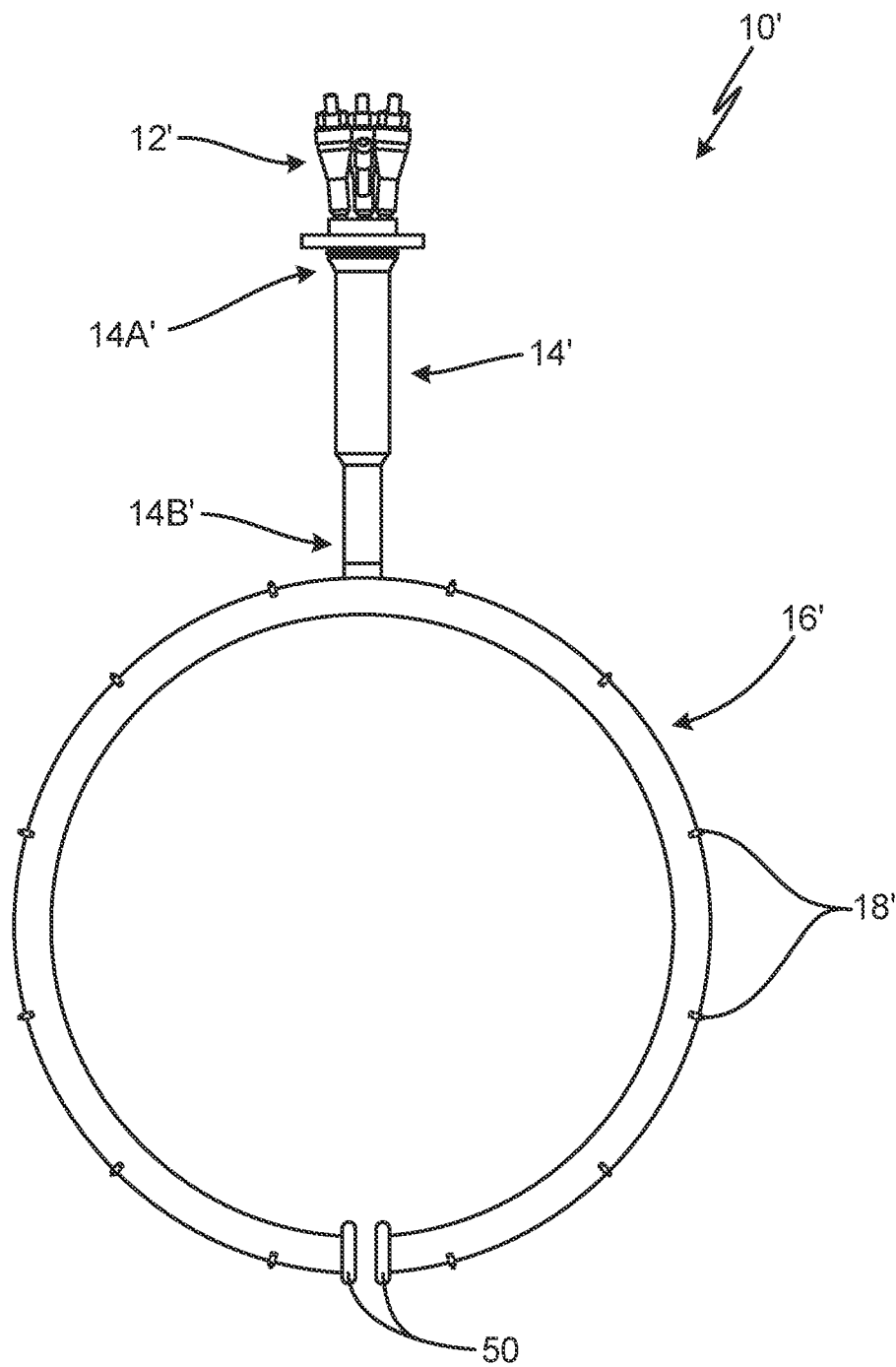
FIG. 3 is a front view of a second torch ignitor system including a split manifold.

FIG. 3 is a front view of second torch ignitor system 10' with split manifold 16'. The components and functionality of the components of second torch ignitor system 10' are nearly identical as torch ignitor system 10 described in FIGS. 1A-2C. Therefore, to avoid redundant disclosures, each component of second torch ignitor system 10' will not be described in detail and only the differences between second torch ignitor system 10' and torch ignitor system 10 will be described. As shown in FIG. 3, manifold 16' differs from manifold 16 of torch ignitor system 10 (FIGS. 1A-2C) in that manifold 16' is split near the bottom of manifold 16' and caps 50 cover the split in manifold 16'. More specifically, manifold 16' is split or separated at a location positioned 180 degrees around manifold 16', with respect to combustion chamber 14' and the location where an ignited fuel and air mixture enters manifold 16'. Caps 50 are positioned to cover the interior opening of manifold 16' at the split location, preventing the ignited fuel and air mixture from escaping or jetting through the split. Caps 50 can be constructed from the same or similar material as manifold 16'. The split in manifold 16' and caps 50 are configured to prevent excess fuel and/or debris from settling in the bottom farthest portion of manifold 16', away from combustion chamber 14'. The split in manifold 16' and caps 50 prevent settling of debris and also force any excess fuel and/or debris to expel or jet outwards from the last torch nozzle 18, keeping the interior of manifold 16' free of excess fuel and/or debris. Keeping the interior of manifold 16' clean reduces the chances of torch nozzles 18' becoming clogged and ensures second torch ignitor system 10' remains in a safe operational state.

In the embodiment shown, manifold 16' includes a split positioned 180 degrees around manifold 16', with respect to second end 14B' of combustion chamber 14'. In another embodiment, manifold 16' can include a split positioned at any location or angle around manifold 16', with respect to second end 14B' of combustion chamber 14'. In an example, second end 14B' of combustion chamber 14' can be positioned tangentially to manifold 16' and the flame or torch exiting second end 14B' can have a tangential entry into manifold 16'. In this example, manifold 16' can include a split adjacent one side of second end 14B' of combustion chamber 14', such that the flame or torch flows approximately 345 degrees around manifold 16' before reaching cap 50 covering the split in manifold 16'. Although cap 50 is described in this example as being positioned at a specific angle, it is to be understood that cap 50 can be positioned at any angle about manifold 16'. The angle in which cap 50 is positioned about manifold 16' varies depending on many factors, such as the angle that combustion chamber 14' is coupled to manifold 16', the ignited fuel and air flow characteristics within torch ignitor system 10', and the pressure in which torch ignitor system 10' is operated, among other variables.

Torch ignitor system 10 offers many advantages for a gas turbine engine, as compared to traditional spark ignitors, that will be appreciated by those familiar with ignition techniques of gas turbine engines. Torch ignitor system 10 flows the torch or flame (ignited fuel and air mixture) through manifold 16, allowing the torch of flame to simultaneously ignite multiple fuel nozzles of combustor 44. In turn, this allows the gas turbine engine to have a softer start for all fuel nozzles 42, as compared to a traditional spark ignitor. A softer start for the gas turbine engine means the torch or flame can ignite the fuel within combustor 44 and start the gas turbine engine with less pressure and less atomization of the fuel spraying into combustor 44, compared to traditional spark ignitors. In contrast, previous gas turbine engines utilizing traditional spark ignitors require a high-pressure environment to ignite the fuel within combustor 44. The softer start, as compared to traditional spark ignitors, is useful at re-igniting the gas turbine engine at high altitudes if the gas turbine engine were to be extinguished. Torch ignitor system 10 including manifold 16 provides a constant flame or torch to multiple fuel nozzles 42, allowing torch ignitor system 10 to ignite multiple fuel nozzles 42 simultaneously. The redundancy of flames or torches igniting the fuel dispensing from fuel nozzles 42 provides a more stable and overall better ignition system because multiple flames are available to ignite the atomized fuel within the gas turbine engine. As such, torch ignitor system 10 is a safer and more reliable ignition system than traditional spark ignitor systems used in gas turbine engines.

Further, torch ignitor system 10 provides an independent heat source to combustor 44, which is used to ignite, stabilize, and relight a fuel and air mixture within combustor 44. The continuous flame of torch ignitor system 10 is maintained within combustion chamber 14 and manifold 16 of torch ignitor system 10 during operation of the gas turbine engine. Therefore, the isolated continuous flame of torch ignitor system 10 is not affected by any blow out or other conditions that may occur within combustor 44, thus stabilizing the gas turbine engine during any disturbances that may occur within combustor 44. The continuous torch or flame of torch ignitor system 10 allows torch ignitor system 10 to rapidly relight the fuel and air mixture within combustor 44 if combustor 44 is extinguished. In contrast, traditional spark ignitors can have issues of contamination of the tip of the spark ignitor with burnt debris, causing the spark ignitor to fail to produce a spark to ignite the fuel and air mixture. Therefore, the continuous flame or torch of torch ignitor system 10 is a more reliable solution that will have an increased useful lifespan, as compared to traditional spark ignitors, due to minimizing failures and maintenance of the ignitor. Torch ignitor system 10 offers many other advantages not specifically described, that will be appreciated by those familiar with ignition techniques of gas turbine engines.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A torch ignitor system for use with a gas turbine engine including a high-pressure compressor, a high-pressure case, fuel nozzles, and a combustor. The torch ignitor system includes a torch ignitor, a manifold, and a combustion chamber. The torch ignitor is coupled to the high-pressure case of the gas turbine engine. The manifold is positioned within the high-pressure case and the manifold includes a plurality of torch nozzles extending from the manifold into the combustor of the gas turbine engine. The combustion chamber is positioned within the high-pressure case and the combustion chamber includes a first end coupled to the torch ignitor and a second end coupled and fluidly connected to the manifold. The combustion chamber is configured such that in operation, an ignited fuel and air mixture flows through the combustion chamber, into and through the manifold, and exits through each of the plurality of torch nozzles into the combustor of the gas turbine engine.

The torch ignitor system of the preceding paragraph can optionally include, additionally and/or alternatively, any one or more of the following features, configurations and/or additional components:

The manifold is positioned adjacent and between the high-pressure compressor and the combustor of the gas turbine engine.

The manifold is positioned adjacent and surrounding an outer surface of a combustor liner of the combustor of the gas turbine engine.

The manifold is positioned adjacent a corner of the combustor liner, and wherein the manifold is positioned adjacent a location where fuel nozzles spray fuel into the combustor of the gas turbine engine.

The manifold is positioned axially aft of the fuel nozzles spraying fuel into the combustor of the gas turbine engine.

The torch ignitor is positioned at least partially within the high-pressure case of the gas turbine engine, and wherein the combustion chamber surrounds at least a portion of the torch ignitor.

The torch ignitor includes at least one hot surface ignitor configured to ignite the fuel and air mixture within the combustion chamber.

The at least one hot surface ignitor is a resistance heating element configured to exceed a combustion temperature of the fuel and air mixture to ignite the fuel and air mixture.

The manifold is annular in shape with a circular cross-section such that the manifold is a torus shaped manifold; and the manifold includes tubular walls such that an interior of the manifold is hollow to allow the ignited air and fuel mixture to flow through the manifold.

The manifold is split at a location opposite the location where the second end of the combustion chamber is coupled to the manifold; at least one cap is positioned over an aperture created by the split; and the hollow annular interior of the manifold is blocked from continuous unobstructed flow around the annular interior of the manifold.

Each of the plurality of torch nozzles is positioned adjacent one of the fuel nozzles spraying fuel into the combustor of the gas turbine engine, and wherein the ignited fuel and air mixture exiting each of the plurality of torch nozzles is configured to ignite the fuel exiting each respective fuel nozzle.

Each of the plurality of torch nozzles is positioned adjacent every other one of the fuel nozzles spraying fuel into the combustor of the gas turbine engine, and wherein the ignited fuel and air mixture exiting each of the plurality of torch nozzles is configured to ignite the fuel exiting at least one of the fuel nozzles.

Each of the plurality of torch nozzles is positioned along a centerline of each of the fuel nozzles spraying fuel into the combustor of the gas turbine engine, such that each of the plurality of torch nozzles is incorporated into a respective fuel nozzle to ignite a central portion of the fuel spraying from each fuel nozzle into the combustor of the gas turbine engine.

Each of the plurality of torch nozzles extends from an outer surface of the manifold into the combustor at an oblique angle with respect to a centerline of the fuel nozzles spraying fuel into the combustor of the gas turbine engine.

The combustion chamber further includes quenching apertures positioned within an outer body of the combustion chamber; and the quenching apertures are configured to supply air within the combustion chamber to reduce a temperature of the ignited fuel and air mixture exiting the combustion chamber before entering the manifold of the torch ignitor system.

The combustion chamber includes a plurality of vanes positioned within an outer body of the combustion chamber, and wherein the vanes are configured to allow air to flow through the outer body to cool the combustion chamber.

The combustion chamber and the vanes of the combustion chamber are manufactured using additive manufacturing technology.

The manifold includes a plurality of vanes positioned within an outer wall of the manifold, and wherein the vanes are configured to allow air to flow through the outer wall to cool the manifold.

Two or more torch ignitors are fluidly connected to the manifold to ignite the fuel and air mixture within the combustion chamber and the manifold.

A method of igniting fuel within a combustor of a gas turbine engine including a high-pressure compressor, a high-pressure case, fuel nozzles, and a combustor is disclosed. The method including: igniting, by a torch ignitor of a torch ignitor system, a fuel and air mixture within a combustion chamber of the torch ignitor system, wherein the torch ignitor is coupled to the high-pressure case of the gas turbine engine; flowing the ignited fuel and air mixture through the combustion chamber from a first end of the combustion chamber to a second end of the combustion chamber, wherein the first end is coupled to the torch ignitor and the second end is coupled and fluidly connected to a manifold, and wherein the combustion chamber is positioned within the high-pressure case of the gas turbine engine; flowing the ignited fuel and air mixture from the second end of the combustion chamber into and through the manifold, wherein the manifold is positioned within the high-pressure case of the gas turbine engine; and flowing the ignited fuel and air mixture from the manifold through a plurality of torch nozzles extending from the manifold into the combustor of the gas turbine engine, wherein the ignited fuel and air mixture exits the torch nozzles into the combustor and ignites the fuel sprayed from the fuel nozzles into the combustor of the gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A torch ignitor system comprising:
a torch ignitor comprising:
  a housing;
  a plurality of hot surface ignitors coupled to the housing;
  a fuel inlet coupled to the housing, wherein the fuel inlet provides a flow path for fuel to enter the housing; and
  an air inlet positioned within the housing, wherein the air inlet provides a flow path for air to enter the housing and mix with the fuel entering the housing to create a fuel and air mixture;
  wherein the plurality of hot surface ignitors are configured to ignite the fuel and air mixture to create an ignited fuel and air mixture; and
a combustion chamber positioned between and fluidly coupling the torch ignitor to an annular manifold, wherein the combustion chamber includes a hollow center portion to allow the ignited fuel and air mixture to flow to the annular manifold and wherein the annular manifold has a circular cross-section such that the annular manifold is a torus shaped manifold and the annular manifold includes tubular walls such that an interior of the annular manifold is hollow to allow the ignited fuel and air mixture to flow through the annular manifold;
wherein the annular manifold includes a plurality of torch nozzles extending from the annular manifold for expelling the ignited fuel and air mixture, wherein the plurality of torch nozzles are spaced around an outer wall of the annular manifold.

2. The torch ignitor system of claim 1, wherein each of the plurality of hot surface ignitors are resistance heating elements configured to exceed an ignition temperature of the fuel and air mixture to ignite the fuel and air mixture.

3. The torch ignitor system of claim 1, wherein a portion of the fuel inlet is positioned outside the housing and another portion of the fuel inlet is positioned within the housing.

4. The torch ignitor system of claim 1, wherein the air inlet is a metering valve, and wherein the air inlet is configured to receive the air and meter or regulate an amount of the air entering the housing.

5. The torch ignitor system of claim 1, wherein the combustion chamber is a tube, and wherein the combustion chamber includes an outer body defining the hollow center portion.

6. The torch ignitor system of claim 5, wherein the outer body includes an inner skin, an outer skin, and a plurality of vanes positioned between the inner skin and the outer skin, and wherein a fluid flow path exists between the inner skin and the outer skin to allow a cooling fluid to flow within the outer body and past the plurality of vanes to reduce a temperature of the combustion chamber.

7. The torch ignitor system of claim 1, wherein the combustion chamber includes a first end coupled to the torch ignitor and a second end coupled to the annular manifold, and wherein an inner diameter of the first end of the combustion chamber is greater than an inner diameter of the second end of the combustion chamber.

8. The torch ignitor system of claim 1, wherein a cross-sectional area of the interior of the annular manifold gradually decreases extending from a location where the annular manifold is coupled to the combustion chamber to a location positioned farthest away from the location where the annular manifold is coupled to the combustion chamber.

9. The torch ignitor system of claim 1, wherein:
the annular manifold comprises a split at a location opposite a location where the combustion chamber is coupled to the annular manifold;
at least one cap is positioned over an aperture created by the split; and
an interior of the annular manifold is blocked from continuous unobstructed flow around the interior of the annular manifold.

10. The torch ignitor system of claim 1, wherein an outer wall of the annular manifold includes an inner skin, an outer skin, and a plurality of vanes positioned between the inner skin and the outer skin, and wherein a fluid flow path exists between the inner skin and the outer skin to allow a cooling fluid to flow within the outer wall and past the plurality of vanes to reduce a temperature of the annular manifold.

* * * * *